(12) United States Patent
Zhao et al.

(10) Patent No.: US 11,477,793 B2
(45) Date of Patent: Oct. 18, 2022

(54) INFORMATION TRANSMISSION METHOD AND DEVICE

(71) Applicant: HUAWEI TECHNOLOGIES CO., LTD., Guangdong (CN)

(72) Inventors: Yue Zhao, Beijing (CN); Fang Nan, Shenzhen (CN); Zheng Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/035,549

(22) Filed: Sep. 28, 2020

(65) Prior Publication Data
US 2021/0014867 A1    Jan. 14, 2021

Related U.S. Application Data

(63) Continuation of application No. PCT/CN2018/082047, filed on Apr. 4, 2018.

(51) Int. Cl.
| | | |
|---|---|---|
| *H04W 72/04* | (2009.01) | |
| *H04W 4/80* | (2018.01) | |
| *H04W 80/02* | (2009.01) | |

(52) U.S. Cl.
CPC ......... *H04W 72/0493* (2013.01); *H04W 4/80* (2018.02); *H04W 72/042* (2013.01); *H04W 72/0453* (2013.01); *H04W 80/02* (2013.01)

(58) Field of Classification Search
CPC . H04W 72/0493; H04W 4/80; H04W 72/042; H04W 72/0453; H04W 80/02
See application file for complete search history.

(56) References Cited

U.S. PATENT DOCUMENTS

| | | | | |
|---|---|---|---|---|
| 2016/0242207 | A1* | 8/2016 | Yasukawa | H04W 72/042 |
| 2018/0049201 | A1* | 2/2018 | Hussain | H04W 72/042 |
| 2018/0149176 | A1 | 5/2018 | Sueyoshi et al. | |

FOREIGN PATENT DOCUMENTS

| | | |
|---|---|---|
| CN | 106162897 A | 11/2016 |
| CN | 106686740 A | 5/2017 |

(Continued)

OTHER PUBLICATIONS

Huawei et al.,"On Sub-RB resource allocation for MTC PUSCH",3GPP TSG RAN WG1 Meeting #92 R1-1801432, Athens, Greece, Feb. 26-Mar. 2, 2018,Total 7 Pages.

(Continued)

*Primary Examiner* — Samina F Choudhry
(74) *Attorney, Agent, or Firm* — Womble Bond Dickinson (US) LLP

(57) ABSTRACT

A terminal device receives downlink control information sent by a network device. The downlink control information includes a resource allocation field. The resource allocation field includes $$\left\lceil \log_2 \left\lfloor \frac{N_{RB}^{UL}}{6} \right\rfloor \right\rceil$$

high-order bits and M low-order bits. When the resource allocation field is used to indicate an allocated subcarrier resource, K bit states in bit states of the M bits are used to indicate allocation of subcarrier resources, and a quantity of subcarriers indicated by each of the K bit states is less than 12. The terminal device determines, based on the resource allocation field, whether the resource block or the subcarrier resource is allocated. The terminal device sends information on the allocated resource block or the subcarrier resource.

(Continued)

The method and the device provided in embodiments of the application can be applied to a communications system.

16 Claims, 5 Drawing Sheets

(56) References Cited

FOREIGN PATENT DOCUMENTS

CN          107734692 A     2/2018
WO      2016053450 A1    4/2016

OTHER PUBLICATIONS

Zte et al.,"Design of PUSCH Sub-PRB allocation for MTC",GPP TSG RAN WG1 Meeting #92 R1-1801600,Athens, Greece, Feb. 26-Mar. 2, 2018,Total 7 Pages.

Huawei et al.,"DCI content for MTC and coverage enhancement",3GPP TSG RAN WG1 Meeting #82 R1-154602, Beijing, China, Aug. 24-28, 2015,Total 5 Pages.

\* cited by examiner

INFORMATION TRANSMISSION METHOD AND DEVICE

CROSS-REFERENCE TO RELATED APPLICATIONS

This application is a continuation of International Application No. PCT/CN2018/082047, filed on Apr. 4, 2018, the disclosure of which is hereby incorporated by reference in its entirety.

TECHNICAL FIELD

Embodiments of the application relate to the communications field, and in particular, to an information transmission method and a device.

BACKGROUND

Currently, wireless communications systems are used and deployed on a large scale, and can provide, for a plurality of users, various types of communication, for example, voice, data, and multimedia services.

During discussion of a current long term evolution (LTE) technology, uplink user data may be transmitted by using a third message, that is, a Msg3, in a random access process, and a medium access control (MAC) protocol random access response (RAR) is used in the transmission of the uplink user data by using the Msg3.

Coverage enhancement modes of a terminal device may include a coverage enhancement mode A (CE mode A) and a coverage enhancement mode B (CE mode B). The coverage enhancement mode A is specific to a smaller coverage enhancement degree, and the coverage enhancement mode B is specific to a larger coverage enhancement degree.

How to implement resource allocation in the coverage enhancement mode to improve resource utilization is a problem that needs to be urgently resolved in the art.

SUMMARY

Embodiments of the application provide an information transmission method and a device, to implement resource allocation in a coverage enhancement mode and improve resource utilization.

An embodiment of the application provides an information transmission method, including:

receiving, by a terminal device, downlink control information sent by a network device, where the downlink control information includes a resource allocation field, the resource allocation field is used to indicate an allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer; and determining, by the terminal device based on the resource allocation field, whether the resource block or the subcarrier resource is allocated, and sending information on the allocated resource block or subcarrier resource.

In an embodiment of the application, the network device indicates, by using different values of the bit states included in the resource allocation field, to allocate the resource block or the subcarrier resource to the terminal device. When the resource allocation field is used to indicate the allocated resource block, the $$\left\lceil \log_2 \left\lfloor \frac{N_{RB}^{UL}}{6} \right\rfloor \right\rceil$$

high-order bits indicate the narrowband index, the L bit states in the bit states of the M low-order bits can be used to indicate the allocation of the resource blocks in the narrowband, and the quantity of resource blocks indicated by each of the L bit states is greater than or equal to 1; or when the resource allocation field is used to indicate the allocated subcarrier resource, the K bit states in the bit states of the M bits can be used to indicate the allocation of the subcarrier resources, and the quantity of subcarriers indicated by each of the K bit states is less than 12. In this way, resources fewer than 12 subcarriers can be allocated, and valid resources can be allocated to more UEs, thereby improving spectrum utilization efficiency.

In an embodiment, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the method further includes: receiving, by the terminal device, radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the method further includes: receiving, by the terminal device, radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the method further includes: receiving, by the terminal device, radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

An example is used for description below: K bit states can be used to indicate resource allocation of three subcarriers or six subcarriers in any one of X resource blocks in a narrowband, and each of the K bit states corresponds to one of W values of a quantity of resource units, where X is a positive integer, and W is a positive integer. A resource unit (RU) occupies fewer than 12 subcarriers in frequency domain, and occupies a resource larger than one subframe in time domain. For example, when six subcarriers are allocated, the resource unit corresponds to a frequency resource of six subcarriers in frequency domain, and occupies two subframes in time domain. For example, when three subcarriers are allocated, the resource unit corresponds to a frequency resource of three subcarriers in frequency domain, and occupies four subframes in time domain. For example, when two subcarriers are allocated, the resource unit corresponds to a frequency resource of two subcarriers in frequency domain, and occupies eight subframes in time domain. A resource allocation granularity is three subcarriers or six subcarriers.

For example, the network device may send radio resource control signaling or medium access control signaling, and a specific type of signaling to be used depends on an application scenario. T resource blocks are configured by using the radio resource control signaling or the medium access control signaling, and a resource allocation granularity is three subcarriers or six subcarriers.

In an embodiment,
the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

For example, when M=7, L=21, K=107, W=3, and X=6, there are a total of 128 states indicated by seven bits. It is assumed that a quantity of RUs has three values, which are 1, 2, and 4. Among the 128 states, 21 states indicate allocation of resource blocks in a narrowband. During allocation of subcarrier resources, three subcarriers and six subcarriers are allocated in each of the six resource blocks, and each subcarrier allocation method corresponds to three RU allocation methods. In this way, with reference to the foregoing table, a total of 3 (three values of the quantity of RUs)×6 (six resource blocks)×6 (six subcarrier allocation methods in each resource block)=108 states are required to indicate allocation of subcarriers and RUs. However, 107 states indicated by the seven bits are available. Therefore, one state that indicates an allocation combination of a subcarrier and an RU is removed from the 108 states. For example, during resource allocation, allocation of four RUs and six subcarriers on the sixth RB in the narrowband is not supported.

Further, considering that one or two states are still required for early data termination and/or control channel termination, one or two states may be further reserved in the 107 states to indicate the early data termination and/or the control channel termination. In this way, 106 or 105 states may be used to indicate allocation of subcarriers and RUs. The removed allocation combination of a subcarrier and an RU is pre-specified in a standard.

Optionally, an allocation combination of resource blocks is removed. That is, among the 128 states, 20 states indicate allocation of resource blocks in the narrowband. In this way, 3 (three values of the quantity of RUs)×6 (six resource blocks)×6 (six subcarrier allocation methods in each resource block)=108 states indicate allocation of subcarriers and RUs.

In an embodiment,
the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

For example, when M=5, L=8, K=24, W=2, and X=2, there are a total of 32 states indicated by five bits. It is assumed that a quantity of RUs has two values, which are 2 and 4. Among the 32 states, eight states indicate allocation of resource blocks in a narrowband. During allocation of subcarrier resources, three subcarriers and six subcarriers are allocated in each of the two resource blocks, and each subcarrier allocation method corresponds to two RU allocation methods. In this way, with reference to the foregoing table, a total of 2 (two values of the quantity of RUs)×2 (two resource blocks)×6 (six subcarrier allocation methods in each resource block)=24 states are required to indicate allocation of subcarriers and RUs.

Herein, based on the combination of M, L, K, W, X, T, N, and Y, the resource block and the subcarrier resource are allocated similarly as what is described above, and details are not described herein again.

An embodiment of the application provides an information transmission method, including:

allocating, by a network device, a resource block or a subcarrier resource to a terminal device;

determining, by the network device, downlink control information, where the downlink control information includes a resource allocation field, the resource allocation field is used to indicate the allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer;

sending, by the network device, the downlink control information to the terminal device; and receiving, by the network device on the allocated resource block or subcarrier resource, information sent by the terminal device.

In an embodiment, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the method further includes: sending, by the network device, radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the method further includes: sending, by the network device, radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the method further includes: sending, by the network device, radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

In an embodiment, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

In an embodiment, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

An embodiment of the application provides a terminal device, including:

a receiving module, configured to receive downlink control information sent by a network device, where the downlink control information includes a resource allocation field, the resource allocation field is used to indicate an allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer;

a processing module, configured to determine, based on the resource allocation field, whether the resource block or the subcarrier resource is allocated; and a sending module, configured to send information on the allocated resource block or subcarrier resource.

In an embodiment, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the receiving module is further configured to receive radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the receiving module is further configured to receive radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the receiving module is further configured to receive radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

In an embodiment, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

In an embodiment, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

In an embodiment, the composition modules of the terminal device may further perform the operations as described herein.

An embodiment of the application provides a network device, including:

a processing module, configured to allocate a resource block or a subcarrier resource to a terminal device, where the processing module is further configured to determine downlink control information, where the downlink control information includes a resource allocation field, the resource allocation field is used to indicate the allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer;

a sending module, configured to send the downlink control information to the terminal device; and a receiving module, configured to receive, on the resource block or the subcarrier resource allocated by the processing module, information sent by the terminal device.

In an embodiment, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the sending module is further configured to send radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the sending module is further configured to send radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the sending module is further configured to send radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

In an embodiment, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

In an embodiment, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

In an embodiment, the composition modules of the network device may further perform the operations as described herein.

An embodiment of the application provides a computer-readable storage medium. The computer-readable storage medium stores one or more instructions, and when the one or more instructions are executed on a computer, the computer is enabled to perform the methods, as described herein.

An embodiment of the application provides a computer program product including instructions. When the computer program product is executed on a computer, the computer is enabled to perform the methods as described herein.

An embodiment of the application provides a communications apparatus. The communications apparatus may include an entity such as a terminal device, a network device, or a chip. The communications apparatus includes a processor and a memory. The memory is configured to store one or more instructions. The processor is configured to execute the one or more instructions in the memory, to enable the communications apparatus to perform the methods, as described herein.

In an embodiment, the application provides a chip system. The chip system includes a processor and is configured to support a network device or a terminal device in implementing functions, as described herein, for example, sending or processing data and/or information in the f methods, as described herein. In a possible design, the chip system further includes a memory. The memory is configured to store a program instruction and data for the network device. The chip system may include a chip, or may include a chip and another discrete component.

DESCRIPTION OF EMBODIMENTS

Figure 1:
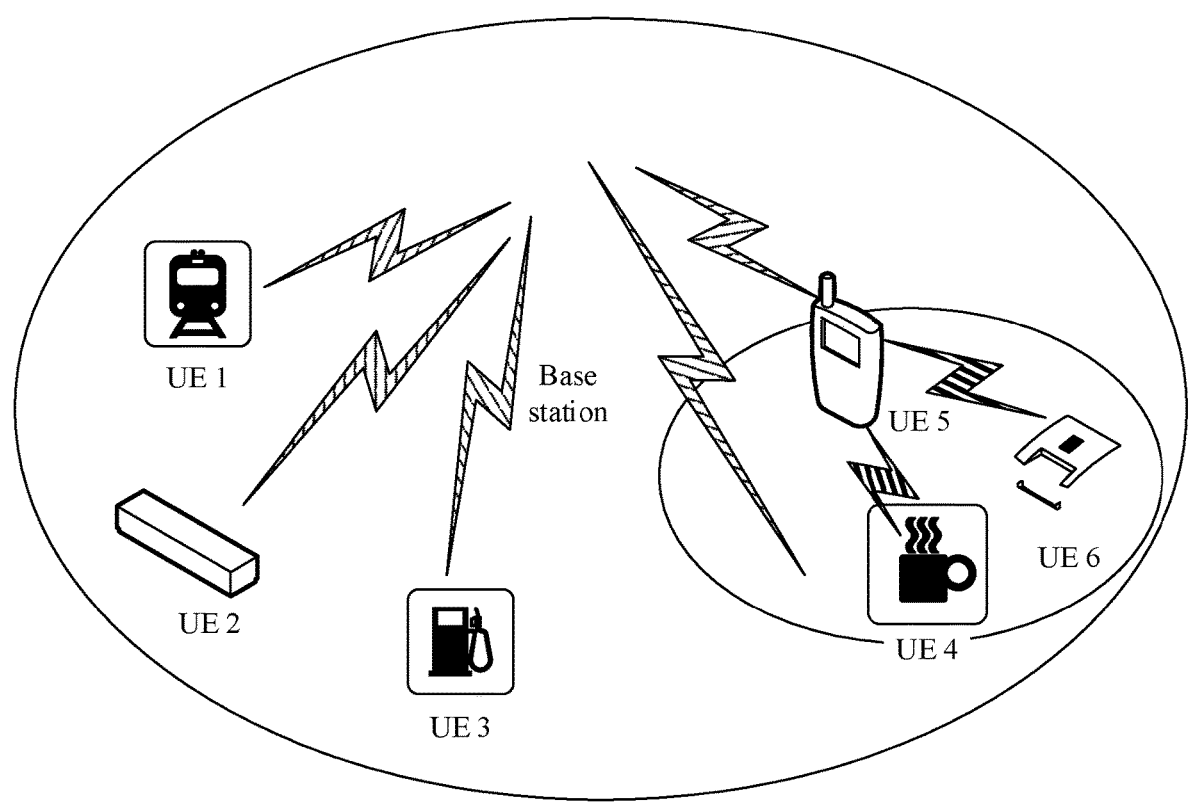
FIG. 1 is a schematic diagram of a system architecture of an information transmission method according to an embodiment of the application.

Embodiments of the application provide an information transmission method and a device, to implement resource allocation in a coverage enhancement mode and improve resource utilization.

The following describes the embodiments of the application with reference to the accompanying drawings.

In the specification, claims, and accompanying drawings of the application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the application. In addition, the terms "include", "contain", and any other variants thereof mean to cover non-exclusive inclusion, so that a process, method, system, product, or device that includes a series of units is not necessarily limited to those units, but may include other units not expressly listed or inherent to such a process, method, system, product, or device.

Technical solutions in the embodiments of the invention may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (single carrier FDMA, SC-FDMA) system, and other systems. The terms "system" and "network" can be interchanged with each other. The CDMA system can implement wireless technologies such as universal terrestrial radio access (UTRA) or CDMA2000. UTRA may include a wideband CDMA (wideband CDMA, WCDMA) technology and another CDMA variation technology. CDMA2000 may cover the interim standard (IS) 2000 (IS-2000), the IS-95 standard, and the IS-856 standard. The TDMA system can implement radio technologies such as global system for mobile communications (GSM). The OFDMA system can implement radio technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. UTRA and E-UTRA are evolved releases of UMTS. 3GPP in long term evolution (LTE) and various releases evolved based on LTE are new releases of UMTS using E-UTRA. A fifth generation (5G) communications system and new radio (NR) are next-generation communications systems that are under research. In addition, the communications systems may further be applicable to a future-oriented communications technology and are applicable to the technical solutions provided in the embodiments of the invention. The system architecture and the service scenario described in the embodiments of the invention are intended to describe the technical solutions in the embodiments of the invention more clearly, and do not constitute a limitation on the technical solutions provided in the embodiments of the invention. One of ordinary skill in the art may know that: With the evolution of the network architecture and the emergence of new service scenarios, the technical solutions provided in the embodiments of the invention are also applicable to similar technical problems.

FIG. 1 is a schematic structural diagram of a possible radio access network (RAN) according to an embodiment of the application. The RAN may be a base station access system of a 2G network (e.g., the RAN includes a base station and a base station controller), may be a base station access system of a 3G network (e.g., the RAN includes a base station and an RNC), may be a base station access system of a 4G network (e.g., the RAN includes an eNB and an RNC), or may be a base station access system of a 5G network.

The RAN includes one or more network devices. The network device may be any device with a wireless transceiver function, or a chip disposed in a device with a wireless transceiver function. The network device includes but is not limited to a base station (BS) (for example, a BS, a NodeB, an evolved NodeB (eNodeB or eNB), a gNodeB or gNB in a fifth generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. The plurality of base stations may support networks using the foregoing one or more technologies, or a future evolved network. A core network may support networks using the foregoing one or more technologies, or a future evolved network. The base station may include one or more co-site or non-co-site transmission reception points (TRP). The network device may alternatively be a radio controller, a centralized unit (CU), or a distributed unit (DU) in a cloud radio access network (CRAN) scenario. The network device may alternatively be a server, a wearable device, a vehicle-mounted device, or the like. An example in which the network device is a base station is used for description. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations supporting different technologies. For example, the terminal devices may support communication with a base station supporting an LTE network, may support communication with a base station supporting a 5G network, and may further support a dual connection to a base station supporting an LTE network and a base station supporting a 5G network. For example, a terminal accesses a radio access network (RAN) node in a wireless network. Currently, some examples of the RAN node are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In a network structure, the network device may include a centralized unit (CU) node, a distributed unit (DU) node, or a RAN device including a CU node and a DU node.

The terminal devices 1 to 6 are also referred to as user equipment (UE), mobile stations (MS), mobile terminals (MT), terminals, and the like, and are devices that provide voice and/or data connectivity for a user or are chips disposed in the devices, for example, handheld devices with a wireless connection function, or vehicle-mounted devices. Currently, some examples of the terminal device are a mobile phone, a tablet, a notebook computer, a palmtop computer, a mobile Internet device (MID), a wearable device, a virtual reality (VR) device, an augmented reality (, AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like.

In the embodiments of the application, the base station and the UE 1 to the UE 6 form a communications system. In the communications system, the base station sends one or more of system information, an RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or more of the UE 4 and the UE 6.

Figure 2:
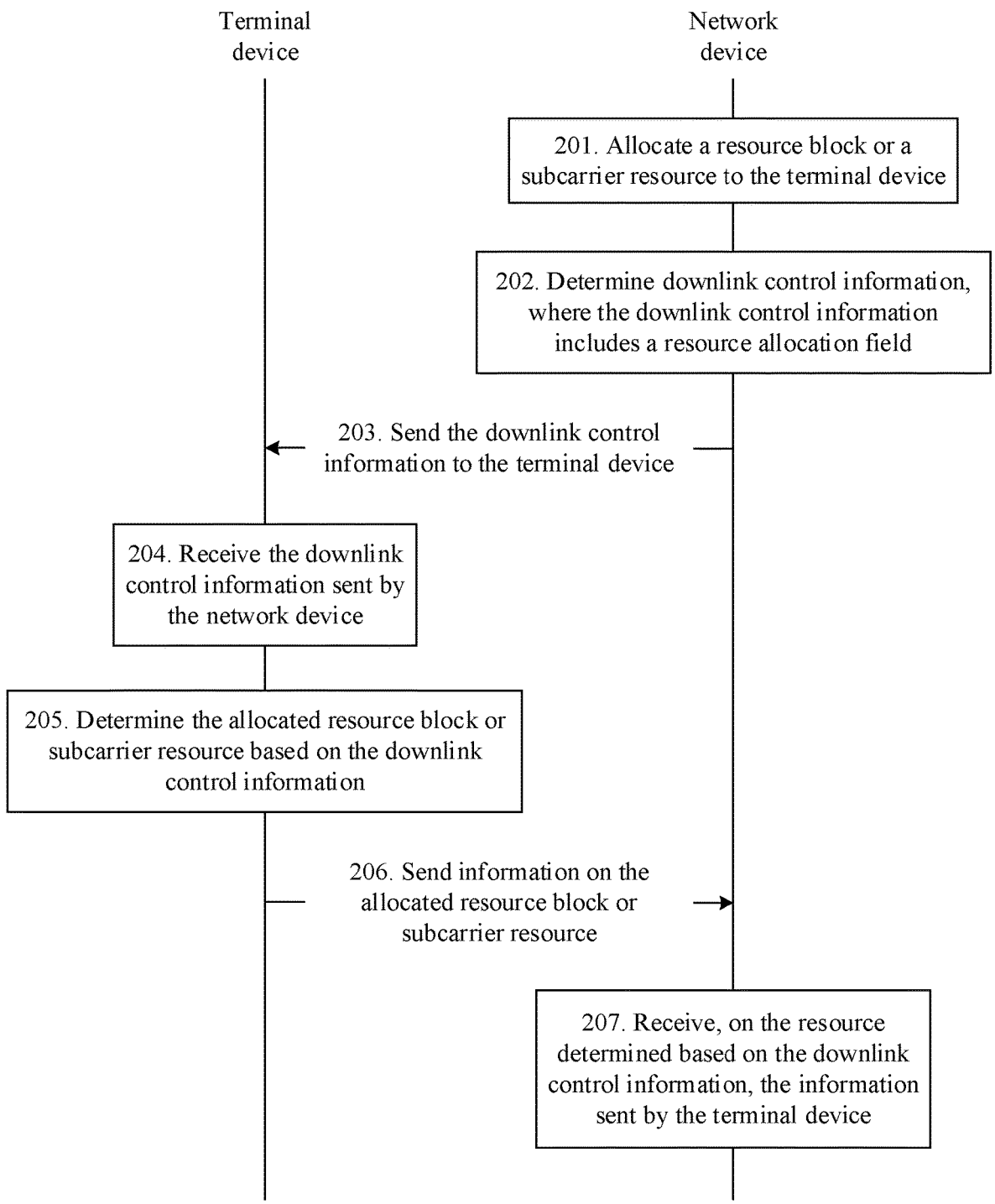
FIG. 2 is a schematic flowchart of interaction between a terminal device and a network device according to an embodiment of the application.

FIG. 2 is a schematic flowchart of interaction between a network device and a terminal device according to an embodiment of the application. An information transmission method provided in an embodiment of the application mainly includes the following operations.

201. The network device allocates a resource block or a subcarrier resource to the terminal device.

In an embodiment of the application, when allocating a resource to the terminal device, the network device may allocate a resource block, that is, allocate a resource in a minimum unit of one resource block. The network device may alternatively allocate a subcarrier resource to the terminal device, that is, allocate a resource in a unit of a subcarrier. For example, the network device may determine, based on current network load, to allocate a resource in a unit of a resource block or a subcarrier resource. For example, in an embodiment of the invention, when the network device allocates a resource to a physical uplink shared channel (PUSCH) by using downlink control information (DCI) Format 6-0A, the minimum unit may be one resource block, and resources fewer than 12 subcarriers can also be allocated, thereby improving spectral efficiency of the PUSCH.

202. The network device determines downlink control information (DCI), where the downlink control information includes a resource allocation field, the resource allocation field is used to indicate the allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth.

When the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband based on an uplink resource allocation type 0, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer.

In an embodiment, $N_{RB}^{UL}$ represents a quantity of uplink physical resource blocks (PRB) included in system bandwidth, ⌊ ⌋ represents a rounding down operation, and ⌈ ⌉ represents a rounding up operation. When the resource allocation field is used to indicate the allocated resource block, and the resource allocation field may also include the $$\left\lceil \log_2 \left\lfloor \frac{N_{RB}^{UL}}{6} \right\rfloor \right\rceil$$

high-order bits and the M low-order bits, the $$\left\lceil \log_2 \left\lfloor \frac{N_{RB}^{UL}}{6} \right\rfloor \right\rceil$$

high-order bits indicate the narrowband index, the L bit states in the bit states of the M low-order bits can be used to indicate the allocation of the resource blocks in the narrowband, and the quantity of resource blocks indicated by each of the L bit states is greater than or equal to 1, where L is a positive integer. For example, a value of M may be 7, and a value of L is 21. Alternatively, M is 5, and L is 8. The quantity of resource blocks indicated by the resource allocation field is greater than or equal to 1, in other words, a resource allocation granularity is a PRB level.

When the resource allocation field is used to indicate the allocated subcarrier resource, and the resource allocation field includes the $$\left\lceil \log_2\left\lfloor \frac{N_{RB}^{UL}}{6} \right\rfloor \right\rceil$$

high-order bits and the M low-order bits, the $$\left\lceil \log_2\left\lfloor \frac{N_{RB}^{UL}}{6} \right\rfloor \right\rceil$$

high-order bits indicate the narrowband index, the M low-order bits indicate the allocation of the subcarrier resources in the K resource blocks, and the quantity of subcarriers indicated by the resource allocation field is less than 12. Generally, one resource block includes 12 subcarriers. In an embodiment of the application, the quantity of subcarriers indicated by the resource allocation field is less than 12, in other words, a resource allocation granularity is a sub-PRB level or a subcarrier level. Therefore, there may be a smaller resource allocation granularity. The M low-order bits indicate the allocation of the subcarrier resources in the K resource blocks. In this case, the K resource blocks are resource blocks configured by the network device or preset resource blocks. In this case, the network device may indicate the allocated subcarrier resource to the terminal device by using the M low-order bits.

203. The network device sends the downlink control information to the terminal device.

After the network device determines the downlink control information, the network device may send the downlink control information to the terminal device. The downlink control information includes the resource allocation field, and the resource allocation field indicates the resource block or the subcarrier resource allocated to the terminal device.

204. The terminal device receives the downlink control information sent by the network device, where the downlink control information includes the resource allocation field, and the resource allocation field includes the $$\left\lceil \log_2\left\lfloor \frac{N_{RB}^{UL}}{6} \right\rfloor \right\rceil$$

high-order bits and the M low-order bits, where M is a positive integer, and $N_{RB}^{UL}$ represents the quantity of resource blocks included in the uplink bandwidth.

When the resource allocation field is used to indicate the allocated resource block, the $$\left\lceil \log_2\left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, and a quantity of resource blocks indicated by each of the L bit states is greater than or equal to 1, where L is a positive integer; or when the resource allocation field is used to indicate the allocated subcarrier resource, K bit states in bit states of the M bits can be used to indicate allocation of subcarrier resources, and a quantity of subcarriers indicated by each of the K bit states is less than 12, where K is a positive integer.

205. The terminal device determines, based on the resource allocation field, whether the resource block or the subcarrier resource is allocated.

The terminal device may determine, based on the $$\left\lceil \log_2\left\lfloor \frac{N_{RB}^{UL}}{6} \right\rfloor \right\rceil$$

high-order bits and the M low-order bits in the resource allocation field, the resource allocated by the network device.

206. The terminal device sends information on the allocated resource block or subcarrier resource.

In an embodiment of the invention, the terminal device may determine, by using the resource allocation field, that the network device performs resource allocation by using the resource block as a unit, or performs resource allocation by using the subcarrier resource as a unit, and determine the allocated resource based on the states of the high-order bits and the low-order bits that are included in the resource allocation field. The terminal device may complete sending of uplink information on the resource allocated by the network device.

207. The network device receives, on the resource determined based on the downlink control information, the information sent by the terminal device.

In an embodiment of the application, the network device detects, on the resource allocated to the terminal device, the information sent by the terminal device. The information sent by the terminal device may be sent on the resource block or the subcarrier resource allocated by the network device. This depends on a resource configuration of the network device.

It can be learned from the example descriptions of the application in the foregoing embodiment that the network device indicates, by using different values of the bit states included in the resource allocation field, to allocate the resource block or the subcarrier resource to the terminal device. When the resource allocation field is used to indicate the allocated resource block, the $$\left\lceil \log_2\left\lfloor \frac{N_{RB}^{UL}}{6} \right\rfloor \right\rceil$$

high-order bits indicate the narrowband index, the L bit states in the bit states of the M low-order bits can be used to indicate the allocation of the resource blocks in the narrowband, and the quantity of resource blocks indicated by each of the L bit states is greater than or equal to 1; or when the resource allocation field is used to indicate the allocated subcarrier resource, the K bit states in the bit states of the M bits can be used to indicate the allocation of the subcarrier resources, and the quantity of subcarriers indicated by each of the K bit states is less than 12. In this way, resources fewer than 12 subcarriers can be allocated, and valid resources can be allocated to more UEs, thereby improving spectrum utilization efficiency.

Figure 3:
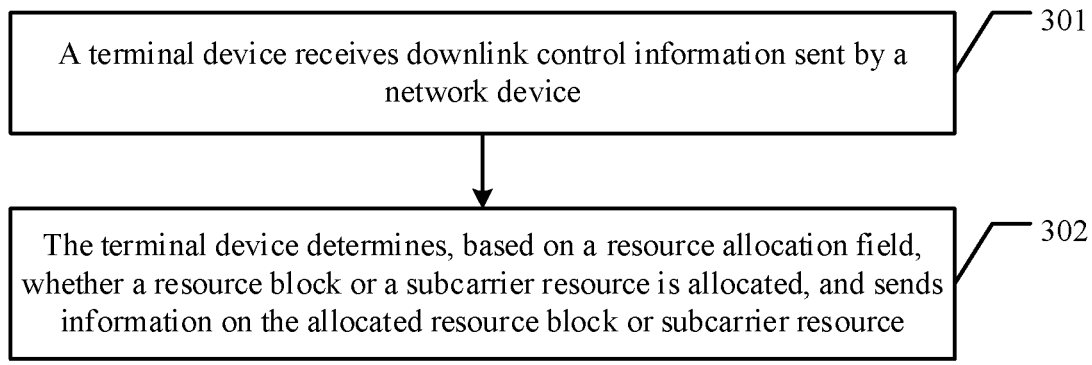
FIG. 3 is a schematic flow block diagram of an information transmission method according to an embodiment of the application.

The following describes, from the perspectives of a network device and a terminal device, the information processing method provided in the embodiments of the application. First, referring to FIG. 3, an embodiment of the application provides an information transmission method, including the following operations.

301. The terminal device receives downlink control information sent by the network device.

The downlink control information includes a resource allocation field, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth.

When the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, and a quantity of resource blocks indicated by each of the L bit states is greater than or equal to 1, where L is a positive integer; or when the resource allocation field is used to indicate the allocated subcarrier resource, K bit states in bit states of the M bits can be used to indicate allocation of subcarrier resource, and a quantity of subcarriers indicated by each of the K bit states is less than 12, where K is a positive integer.

In some embodiments of the application, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the information transmission method provided in an embodiment of the application further includes: receiving, by the terminal device, radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the information transmission method provided in an embodiment of the application further includes: receiving, by the terminal device, radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the information transmission method provided in an embodiment of the application further includes: receiving, by the terminal device, radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

An example is used for description below: K bit states can be used to indicate resource allocation of three subcarriers or six subcarriers in any one of X resource blocks in a narrowband, and each of the K bit states corresponds to one of W values of a quantity of resource units, where X is a positive integer, and W is a positive integer. A resource unit (RU) occupies fewer than 12 subcarriers in frequency domain, and occupies a resource larger than one subframe in time domain. For example, when six subcarriers are allocated, the resource unit corresponds to a frequency resource of six subcarriers in frequency domain, and occupies two subframes in time domain. For example, when three subcarriers are allocated, the resource unit corresponds to a frequency resource of three subcarriers in frequency domain, and occupies four subframes in time domain. For example, when two subcarriers are allocated, the resource unit corresponds to a frequency resource of two subcarriers in frequency domain, and occupies eight subframes in time domain. A resource allocation granularity is three subcarriers or six subcarriers. Values of K, X, and W are described by using examples in subsequent embodiments.

The information transmission method provided in an embodiment of the application further includes: receiving, by the terminal device, radio resource control signaling or medium access control signaling, where T resource blocks are configured by using the radio resource control signaling or the medium access control signaling, and T is a positive integer. That K bit states in bit states of the M bits can be used to indicate allocation of subcarrier resources includes: the K bit states can be used to indicate resource allocation of three subcarriers or six subcarriers in any one of the T resource blocks, and each of the K bit states corresponds to one of W values of a quantity of resource units, where T is a positive integer, and W is a positive integer.

For example, the network device may send radio resource control signaling or medium access control signaling, and a specific type of signaling to be used depends on an application scenario. T resource blocks are configured by using the radio resource control signaling or the medium access control signaling, and a resource allocation granularity is three subcarriers or six subcarriers. Values of K and T are described by using examples in subsequent embodiments.

The information transmission method provided in an embodiment of the application further includes: receiving, by the terminal device, radio resource control signaling or medium access control signaling, where N resource blocks are configured by using the radio resource control signaling or the medium access control signaling, and N is a positive integer. That K bit states in bit states of the M bits can be used to indicate allocation of subcarrier resources includes: the K bit states can be used to indicate resource allocation of two subcarriers, three subcarriers, or six subcarriers in any one of the N resource blocks, and each of the K bit states corresponds to one of W values of a quantity of resource units, where W is a positive integer.

For example, the network device may send radio resource control signaling or medium access control signaling, and a specific type of signaling to be used depends on an application scenario. N resource blocks are configured by using the radio resource control signaling or the medium access control signaling, and a resource allocation granularity is two subcarriers, three subcarriers, or six subcarriers. Values of K and N are described by using examples in subsequent embodiments.

The information transmission method provided in an embodiment of the application further includes: receiving, by the terminal device, radio resource control signaling or medium access control signaling, where Y resource blocks are configured by using the radio resource control signaling or the medium access control signaling. That K bit states in bit states of the M bits can be used to indicate allocation of subcarrier resources includes: the K bit states can be used to indicate resource allocation of two subcarriers, three subcarriers, or six subcarriers in any one of the Y resource blocks, where Y is a positive integer.

For example, the network device may send radio resource control signaling or medium access control signaling, and a specific type of signaling to be used depends on an application scenario. Y resource blocks are configured by using the radio resource control signaling or the medium access control signaling, and a resource allocation granularity is two subcarriers, three subcarriers, or six subcarriers. Values of K and Y are described by using examples in subsequent embodiments.

It should be noted that in the foregoing embodiment of the application, T, N, or Y resource blocks are configured by using the radio resource control signaling or the medium access control signaling. For different quantities of resource blocks, a quantity of subcarriers in any resource block may be determined based on an application scenario. An example is used for description herein and is not used as a limitation on an embodiment of the application.

One resource block includes 12 subcarriers, and indexes Isc of the subcarrier are denoted as Isc=0, 1, 2, . . . , and 11. When it is indicated that allocation is performed at a granularity of two subcarrier resources (that is, two consecutive subcarriers in a unit of three subcarriers), there are four possible allocation methods in one resource block. When it is indicated that allocation is performed at a granularity of three subcarrier resources, there are four possible allocation methods in one resource block. When it is indicated that allocation is performed at a granularity of six subcarrier resources, there are two possible allocation methods in one resource block. The following Table 1 shows a quantity of subcarriers allocated in one resource block and different subcarrier allocation methods corresponding to the quantity of subcarriers.

TABLE 1

| Quantity of subcarriers allocated in one resource block | Index Isc of an allocated subcarrier |
|---|---|
| 2 | {0, 1} |
| 2 | {3, 4} |
| 2 | {6, 7} |
| 2 | {9, 10} |
| 3 | {0, 1, 2} |
| 3 | {3, 4, 5} |
| 3 | {6, 7, 8} |

TABLE 1-continued

| Quantity of subcarriers allocated in one resource block | Index Isc of an allocated subcarrier |
|---|---|
| 3 | {9, 10, 11} |
| 6 | {0, 1, 2, 3, 4, 5} |
| 6 | {6, 7, 8, 9, 10, 11} |

In some embodiments of the application, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

For example, when M=7, L=21, K=107, W=3, and X=6, there are a total of 128 states indicated by seven bits. It is assumed that a quantity of RUs has three values, which are 1, 2, and 4. Among the 128 states, 21 states indicate allocation of resource blocks in a narrowband. During allocation of subcarrier resources, three subcarriers and six subcarriers are allocated in each of the six resource blocks, and each subcarrier allocation method corresponds to three RU allocation methods. In this way, with reference to the foregoing table, a total of 3 (three values of the quantity of RUs)×6 (six resource blocks)×6 (six subcarrier allocation methods in each resource block)=108 states are required to indicate allocation of subcarriers and RUs. However, 107 states indicated by the seven bits are available. Therefore, one state that indicates an allocation combination of a subcarrier and an RU is removed from the 108 states. For example, during resource allocation, allocation of four RUs and six subcarriers on the sixth RB in the narrowband is not supported.

Further, considering that one or two states are still required for early data termination and/or control channel termination, one or two states may be further reserved in the 107 states to indicate the early data termination and/or the control channel termination. In this way, 106 or 105 states may be used to indicate allocation of subcarriers and RUs. The removed allocation combination of a subcarrier and an RU is pre-specified in a standard.

Optionally, an allocation combination of resource blocks is removed. That is, among the 128 states, 20 states indicate allocation of resource blocks in the narrowband. In this way, 3 (three values of the quantity of RUs)×6 (six resource blocks)×6 (six subcarrier allocation methods in each resource block)=108 states indicate allocation of subcarriers and RUs.

Herein, based on the combination of M, L, K, W, X, T, N, and Y, the resource block and the subcarrier resource are allocated similarly as what is described above, and details are not described herein again.

For example, when M=7, L=21, K=90, W=3, and N=3, there are a total of 128 states indicated by seven bits. It is assumed that a quantity of RUs has three values, which are 1, 2, and 4. Among the 128 states, 21 states indicate allocation of resource blocks in a narrowband. During allocation of subcarrier resources, two subcarriers, three subcarriers, and six subcarriers are allocated in each of the three resource blocks, and each subcarrier allocation method corresponds to three RU allocation methods. In this way, with reference to the foregoing table, a total of 3 (three values of the quantity of RUs)×3 (three resource blocks)×10 (10 subcarrier allocation methods in each resource block)= 90 states are required to indicate allocation of subcarriers and RUs.

For example, when M=6, L=21, K=40, and Y=4, there are a total of 64 states indicated by six bits. In this case, during resource allocation, allocation of RUs is not indicated. Among the 64 states, 21 states indicate allocation of resource blocks in a narrowband. During allocation of subcarrier resources, two subcarriers, three subcarriers, and six subcarriers are allocated in each of the four resource blocks. In this way, with reference to the foregoing table, a total of 4 (four resource blocks)×10 (10 subcarrier allocation methods in each resource block)=40 states are required to indicate allocation of subcarriers and RUs.

In some embodiments of the application, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

For example, when M=5, L=8, K=24, W=2, and X=2, there are a total of 32 states indicated by five bits. It is assumed that a quantity of RUs has two values, which are 2 and 4. Among the 32 states, eight states indicate allocation of resource blocks in a narrowband. During allocation of subcarrier resources, three subcarriers and six subcarriers are allocated in each of the two resource blocks, and each subcarrier allocation method corresponds to two RU allocation methods. In this way, with reference to the foregoing table, a total of 2 (two values of the quantity of RUs)×2 (two resource blocks)×6 (six subcarrier allocation methods in each resource block)=24 states are required to indicate allocation of subcarriers and RUs.

Herein, based on the combination of M, L, K, W, X, T, N, and Y, the resource block and the subcarrier resource are allocated similarly as what is described above, and details are not described herein again.

For example, when M=7, L=8, K=120, W=2, and N=6, there are a total of 128 states indicated by seven bits. It is assumed that a quantity of RUs has two values, which are 2 and 4. Among the 128 states, eight states indicate allocation of resource blocks in a narrowband. During allocation of subcarrier resources, two subcarriers, three subcarriers, and six subcarriers are allocated in each of the six resource blocks, and each subcarrier allocation method corresponds to two RU allocation methods. In this way, with reference to the foregoing table, a total of 2 (two values of the quantity of RUs)×6 (six resource blocks)×10 (10 subcarrier allocation methods in each resource block)=120 states are required to indicate allocation of subcarriers and RUs.

For example, when M=5, L=8, K=20, and Y=2, there are a total of 32 states indicated by five bits. In this case, during resource allocation, allocation of RUs is not indicated. Among the 32 states, eight states indicate allocation of resource blocks in a narrowband. During allocation of subcarrier resources, two subcarriers, three subcarriers, and six subcarriers are allocated in each of the two resource blocks. In this way, with reference to the foregoing table, a total of 2 (two resource blocks)×10 (10 subcarrier allocation methods in each resource block)=20 states are required to indicate allocation of subcarriers and RUs.

In an embodiment of the application, it can be implemented that the DCI can support allocation of resources fewer than 12 subcarriers to a PUSCH, and DCI bits are designed, so that with only a few newly added DCI bits, a quantity of allocated subcarriers and a quantity of allocated RUs can be indicated. In this way, the UE can concentrate transmit power in smaller bandwidth, thereby improving PUSCH spectral efficiency and reducing DCI bit overheads.

In some embodiments of the application, $$\left\lceil \log_2 \left\lfloor \frac{N_{RB}^{UL}}{6} \right\rfloor \right\rceil + 5$$

bits may be used to indicate any RB-level resource allocation, and allocation of sub-PRB resources, in two RBs in a narrowband or system bandwidth, configured or preset by a higher layer.

$$\left\lceil \log_2 \left\lfloor \frac{N_{RB}^{UL}}{6} \right\rfloor \right\rceil$$

is used to indicate a narrowband index in the system bandwidth. Eight states among 32 states indicated by bits are used to indicate legacy resource allocation at a PRB granularity. The remaining 24 states among the 32 states indicate resource allocation, which includes the following.

In an embodiment, 24=2×2×6 states are used to indicate two values (which may be 2 and 4) of the quantity of RUs, and sub-PRB resource allocation states in two PRBs. Sub-PRB allocation states are the same when allocation is performed at a granularity of two subcarriers and three subcarriers. A specific mapping relationship may satisfy mapping relationships described in the following Table 2. A PRB n to a PRB n+5 are PRBs in a narrowband indicated by a narrowband index, and a PRB m1 and a PRB m2 are two PRBs, used for sub-PRB resource allocation in a narrowband or system bandwidth, preset or configured by using higher layer signaling.

TABLE 2

| States indicated by five bits | Allocated resource |
|---|---|
| 00000 | PRB n |
| 00001 | PRB n + 1 |
| 00010 | PRB n + 2 |
| 00011 | PRB n + 3 |
| 00100 | PRB n + 4 |
| 00101 | PRB n + 5 |
| 00110 | PRB n, and PRB n + 1 |

TABLE 2-continued

| States indicated by five bits | Allocated resource |
| --- | --- |
| 00111 | PRB n + 2, and PRB n + 3 |
| 01000 | Subcarriers 0, 1, and 2 in the PRB m1 (RU = 1) |
| 01001 | Subcarriers 3, 4, and 5 in the PRB m1 (RU = 1) |
| 01010 | Subcarriers 6, 7, and 8 in the PRB m1 (RU = 1) |
| 01011 | Subcarriers 9, 10, and 11 in the PRB m1 (RU = 1) |
| 01100 | Subcarriers 0, 1, 2, 3, 4, and 5 in the PRB m1 (RU = 1) |
| 01101 | Subcarriers 6, 7, 8, 9, 10, and 11 in the PRB m1 (RU = 1) |
| 01110 | Subcarriers 0, 1, and 2 in the PRB m1 (RU = 2) |
| 01111 | Subcarriers 3, 4, and 5 in the PRB m1 (RU = 2) |
| 10000 | Subcarriers 6, 7, and 8 in the PRB m1 (RU = 2) |
| 10001 | Subcarriers 9, 10, and 11 in the PRB m1 (RU = 2) |
| 10010 | Subcarriers 0, 1, 2, 3, 4, and 5 in the PRB m1 (RU = 2) |
| 10011 | Subcarriers 6, 7, 8, 9, 10, and 11 in the PRB m1 (RU = 2) |
| 10100 | Subcarriers 0, 1, and 2 in the PRB m2 (RU = 1) |
| 10101 | Subcarriers 3, 4, and 5 in the PRB m2 (RU = 1) |
| 10110 | Subcarriers 6, 7, and 8 in the PRB m2 (RU = 1) |
| 10111 | Subcarriers 9, 10, and 11 in the PRB m2 (RU = 1) |
| 11000 | Subcarriers 0, 1, 2, 3, 4, and 5 in the PRB m2 (RU = 1) |
| 11001 | Subcarriers 6, 7, 8, 9, 10, and 11 in the PRB m2 (RU = 1) |
| 11010 | Subcarriers 0, 1, and 2 in the PRB m2 (RU = 2) |
| 11011 | Subcarriers 3, 4, and 5 in the PRB m2 (RU = 2) |
| 11100 | Subcarriers 6, 7, and 8 in the PRB m2 (RU = 2) |
| 11101 | Subcarriers 9, 10, and 11 in the PRB m1 (RU = 2) |
| 11110 | Subcarriers 0, 1, 2, 3, 4, and 5 in the PRB m2 (RU = 2) |
| 11111 | Subcarriers 6, 7, 8, 9, 10, and 11 in the PRB m2 (RU = 2) |

In another embodiment, 20=2×1×10 states are used to indicate two values (which may be 2 and 4) of the quantity of RUs, and a sub-PRB resource allocation state in one PRB. Sub-PRB allocation states are different when allocation is performed at a granularity of two subcarriers and three subcarriers. A specific mapping relationship may satisfy mapping relationships described in the following Table 3. A PRB n to a PRB n+5 are PRBs in a narrowband indicated by a narrowband index, and a PRB m1 is a PRB, used for sub-PRB resource allocation in a narrowband or system bandwidth, preset or configured by using higher layer signaling.

TABLE 3

| States indicated by five bits | Allocated resource |
| --- | --- |
| 00000 | PRB n |
| 00001 | PRB n + 1 |
| 00010 | PRB n + 2 |
| 00011 | PRB n + 3 |
| 00100 | PRB n + 4 |
| 00101 | PRB n + 5 |
| 00110 | PRB n, and PRB n + 1 |
| 00111 | PRB n + 2, and PRB n + 3 |
| 01000 | Subcarriers 0, 1, and 2 in the PRB m1 (three subcarriers, and RU = 1) |
| 01001 | Subcarriers 3, 4, and 5 in the PRB m1 (three subcarriers, and RU = 1) |
| 01010 | Subcarriers 6, 7, and 8 in the PRB m1 (three subcarriers, and RU = 1) |
| 01011 | Subcarriers 9, 10, and 11 in the PRB m1 (three subcarriers, and RU = 1) |
| 01100 | Subcarriers 0, 1, and 2 in the PRB m1 (two subcarriers, and RU = 1) |
| 01101 | Subcarriers 3, 4, and 5 in the PRB m1 (two subcarriers, and RU = 1) |

TABLE 3-continued

| States indicated by five bits | Allocated resource |
| --- | --- |
| 01110 | Subcarriers 6, 7, and 8 in the PRB m1 (two subcarriers, and RU = 1) |
| 01111 | Subcarriers 9, 10, and 11 in the PRB m1 (two subcarriers, and RU = 1) |
| 10000 | Subcarriers 0, 1, 2, 3, 4, and 5 in the PRB m1 (RU = 1) |
| 10001 | Subcarriers 6, 7, 8, 9, 10, and 11 in the PRB m1 (RU = 1) |
| 10010 | Subcarriers 0, 1, and 2 in the PRB m1 (three subcarriers, and RU = 2) |
| 10011 | Subcarriers 3, 4, and 5 in the PRB m1 (three subcarriers, and RU = 2) |
| 10100 | Subcarriers 6, 7, and 8 in the PRB m1 (three subcarriers, and RU = 2) |
| 10101 | Subcarriers 9, 10, and 11 in the PRB m1 (three subcarriers, and RU = 2) |
| 10110 | Subcarriers 0, 1, and 2 in the PRB m1 (two subcarriers, and RU = 2) |
| 10111 | Subcarriers 3, 4, and 5 in the PRB m1 (two subcarriers, and RU = 2) |
| 11000 | Subcarriers 6, 7, and 8 in the PRB m1 (two subcarriers, and RU = 2) |
| 11001 | Subcarriers 9, 10, and 11 in the PRB m1 (two subcarriers, and RU = 2) |
| 11010 | Subcarriers 0, 1, 2, 3, 4, and 5 in the PRB m1 (RU = 2) |
| 11011 | Subcarriers 6, 7, 8, 9, 10, and 11 in the PRB m1 (RU = 2) |

In another embodiment, 18=3×1×6 states are used to indicate three values (which may be 1, 2 and 4) of the quantity of RUs, and a sub-PRB resource allocation state in one PRB. Sub-PRB allocation states are the same when allocation is performed at a granularity of two subcarriers and three subcarriers. A specific mapping relationship may satisfy mapping relationships described in the following Table 4. A PRB n to a PRB n+5 are PRBs in a narrowband indicated by a narrowband index, and a PRB m1 is a PRB, used for sub-PRB resource allocation in a narrowband or system bandwidth, preset or configured by using higher layer signaling.

TABLE 4

| States indicated by five bits | Allocated resource |
| --- | --- |
| 00000 | PRB n |
| 00001 | PRB n + 1 |
| 00010 | PRB n + 2 |
| 00011 | PRB n + 3 |
| 00100 | PRB n + 4 |
| 00101 | PRB n + 5 |
| 00110 | PRB n, and PRB n + 1 |
| 00111 | PRB n + 2, and PRB n + 3 |
| 01000 | Subcarriers 0, 1, and 2 in the PRB m1 (RU = 1) |
| 01001 | Subcarriers 3, 4, and 5 in the PRB m1 (RU = 1) |
| 01010 | Subcarriers 6, 7, and 8 in the PRB m1 (RU = 1) |
| 01011 | Subcarriers 9, 10, and 11 in the PRB m1 (RU = 1) |
| 01100 | Subcarriers 0, 1, 2, 3, 4, and 5 in the PRB m1 (RU = 1) |
| 01101 | Subcarriers 6, 7, 8, 9, 10, and 11 in the PRB m1 (RU = 1) |
| 01110 | Subcarriers 0, 1, and 2 in the PRB m1 (RU = 2) |
| 01111 | Subcarriers 3, 4, and 5 in the PRB m1 (RU = 2) |
| 10000 | Subcarriers 6, 7, and 8 in the PRB m1 (RU = 2) |
| 10001 | Subcarriers 9, 10, and 11 in the PRB m1 (RU = 2) |
| 10010 | Subcarriers 0, 1, 2, 3, 4, and 5 in the PRB m1 (RU = 2) |
| 10011 | Subcarriers 6, 7, 8, 9, 10, and 11 in the PRB m1 (RU = 2) |
| 10100 | Subcarriers 0, 1, and 2 in the PRB m1 (RU = 3) |
| 10101 | Subcarriers 3, 4, and 5 in the PRB m1 (RU = 3) |
| 10110 | Subcarriers 6, 7, and 8 in the PRB m1 (RU = 3) |
| 10111 | Subcarriers 9, 10, and 11 in the PRB m1 (RU = 3) |
| 11000 | Subcarriers 0, 1, 2, 3, 4, and 5 in the PRB m1 (RU = 3) |

TABLE 4-continued

| States indicated by five bits | Allocated resource |
|---|---|
| 11001 | Subcarriers 6, 7, 8, 9, 10, and 11 in the PRB m1 (RU = 3) |
| 11010 | Unused (or used to indicate other functions/states) |
| 11011 | Unused (or used to indicate other functions/states) |
| 11100 | Unused (or used to indicate other functions/states) |
| 11101 | Unused (or used to indicate other functions/states) |
| 11110 | Unused (or used to indicate other functions/states) |
| 11111 | Unused (or used to indicate other functions/states) |

In an embodiment of the application, resource allocation fields in the downlink control information are jointly encoded, and one bit is saved compared with that used in independent encoding. When the quantity of RUs and resource allocation are separately encoded, the quantity of RUs has two states, and one bit is required. In resource allocation, for (2×6)+8=20 states, five bits are required. In an embodiment of the invention, two bits need to be added to the resource allocation field, so that the existing RB-level resource allocation, resource allocation of three subcarriers, and resource allocation of six subcarriers can be supported, and the quantity of RUs can be indicated.

In some embodiments of the application, $$\left\lceil \log_2 \left\lfloor \frac{N_{RB}^{UL}}{6} \right\rfloor \right\rceil + 7$$

bits are used to indicate any RB-level resource allocation, and allocation of sub-PRB resources, in four RBs in a narrowband or system bandwidth, configured or preset by a higher layer.

$$\left\lceil \log_2 \left\lfloor \frac{N_{RB}^{UL}}{6} \right\rfloor \right\rceil$$

is used to indicate a narrowband index in the system bandwidth.

Eight states among 128 states indicated by seven bits are used to indicate resource allocation at a PRB granularity.

The remaining 120 states among the 128 states indicated by the seven bits indicate resource allocation, which includes the following:

In an embodiment, 120=3×4×10 states are used to indicate three values (which may be 1, 2 and 4) of the quantity of RUs, and a sub-PRB resource allocation state in four PRBs. Sub-PRB allocation states are different when allocation is performed at a granularity of two subcarriers and three subcarriers. A PRB n to a PRB n+5 are PRBs in a narrowband indicated by a narrowband index, and a PRB m1, a PRB m2, a PRB m3, and a PRB m4 are four PRBs, used for sub-PRB resource allocation in a narrowband or system bandwidth, preset or configured by using higher layer signaling.

In an embodiment of the application, a method for jointly indicating a quantity of RUs and a quantity of RBs is used in an embodiment of the application, and one bit is saved compared with that used in independent encoding. Four bits need to be added to the resource allocation field, so that the existing RB-level resource allocation and resource allocation of two/three/six subcarriers can be supported, and the quantity of RUs can be indicated.

302. The terminal device determines, based on the resource allocation field, whether the resource block or the subcarrier resource is allocated, and sends information on the allocated resource block or subcarrier resource.

In an embodiment of the invention, the terminal device may determine, by using the resource allocation field, that the network device performs resource allocation by using the resource block as a unit, or performs resource allocation by using the subcarrier resource as a unit, and determine the allocated resource based on the states of the high-order bits and the low-order bits that are included in the resource allocation field. The terminal device may complete sending of uplink information on the resource allocated by the network device.

It can be learned from the example descriptions of the application in the foregoing embodiment that the network device indicates, by using different values of the bit states included in the resource allocation field, to allocate the resource block or the subcarrier resource to the terminal device. When the resource allocation field is used to indicate the allocated resource block, the $$\left\lceil \log_2 \left\lfloor \frac{N_{RB}^{UL}}{6} \right\rfloor \right\rceil$$

high-order bits indicate the narrowband index, the L bit states in the bit states of the M low-order bits can be used to indicate the allocation of the resource blocks in the narrowband, and the quantity of resource blocks indicated by each of the L bit states is greater than or equal to 1; or when the resource allocation field is used to indicate the allocated subcarrier resource, the K bit states in the bit states of the M bits can be used to indicate the allocation of the subcarrier resources, and the quantity of subcarriers indicated by each of the K bit states is less than 12. In this way, resources fewer than 12 subcarriers can be allocated, and valid resources can be allocated to more UEs, thereby improving spectrum utilization efficiency.

Figure 4:
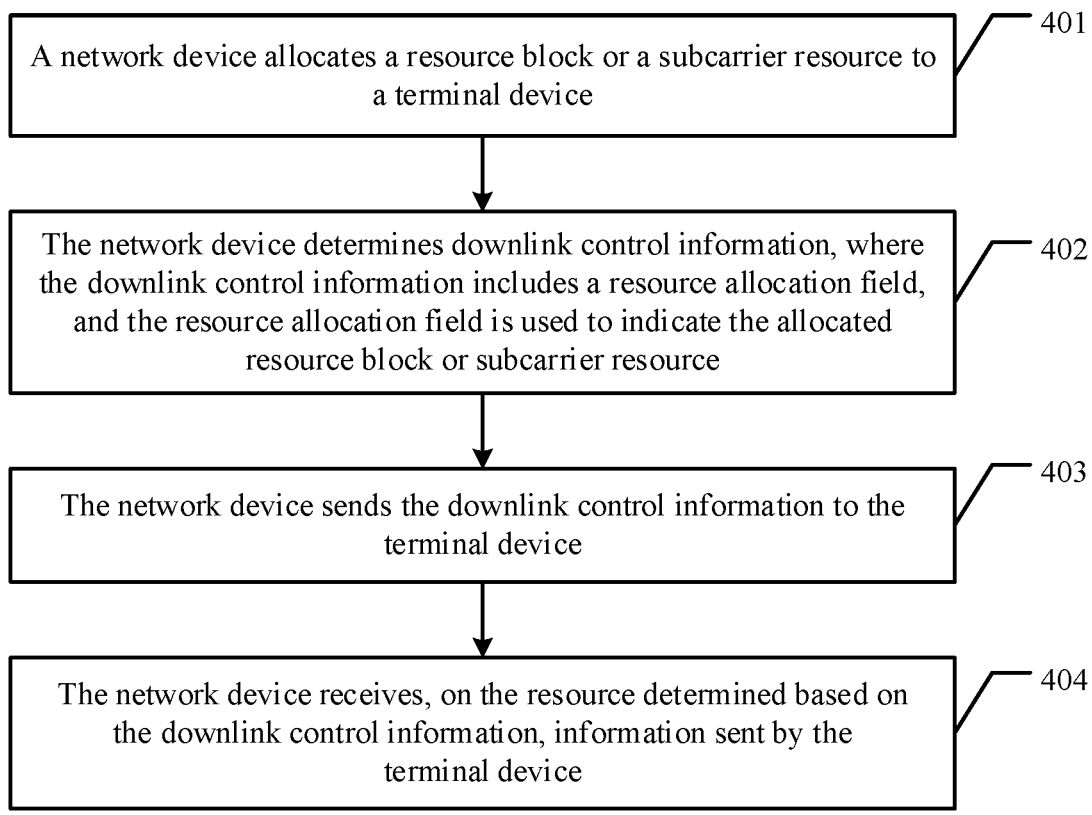
FIG. 4 is a schematic flow block diagram of another information transmission method according to an embodiment of the application.

The foregoing embodiment describes, from the perspective of the terminal device, the information transmission method provided in the embodiments of the application. The following describes, from the perspective of the network device, the information transmission method provided in the embodiments of the application. Referring to FIG. 4, an embodiment of the application provides an information transmission method, including the following operations.

401. The network device allocates a resource block or a subcarrier resource to the terminal device.

402. The network device determines downlink control information, where the downlink control information includes a resource allocation field, the resource allocation field is used to indicate the allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth.

When the resource allocation field is used to indicate the allocated resource block, the $$\left\lceil \log_2\left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer.

In some embodiments of the application, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the information transmission method provided in an embodiment of the application further includes: sending, by the network device, radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the information transmission method provided in an embodiment of the application further includes: sending, by the network device, radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the information transmission method provided in an embodiment of the application further includes: sending, by the network device, radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

In some embodiments of the application, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

Herein, based on the combination of M, L, K, W, X, T, N, and Y, the resource block and the subcarrier resource are allocated as what is described above, and details are not described herein again.

In some embodiments of the application, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

Herein, based on the combination of M, L, K, W, X, T, N, and Y, the resource block and the subcarrier resource are allocated as what is described above, and details are not described herein again.

403. The network device sends the downlink control information to the terminal device.

404. The network device receives, on the resource determined based on the downlink control information, information sent by the terminal device.

It can be learned from the example descriptions of the application in the foregoing embodiment that the network device indicates, by using different values of the bit states included in the resource allocation field, to allocate the resource block or the subcarrier resource to the terminal device. When the resource allocation field is used to indicate the allocated resource block, the $$\left\lceil \log_2\left\lfloor \frac{N_{RB}^{UL}}{6} \right\rfloor \right\rceil$$

high-order bits indicate the narrowband index, the L bit states in the bit states of the M low-order bits can be used to indicate the allocation of the resource blocks in the narrowband, and the quantity of resource blocks indicated by each of the L bit states is greater than or equal to 1; or when the resource allocation field is used to indicate the allocated subcarrier resource, the K bit states in the bit states of the M bits can be used to indicate the allocation of the subcarrier resources, and the quantity of subcarriers indicated by each of the K bit states is less than 12. In this way, resources fewer than 12 subcarriers can be allocated, and valid resources can be allocated to more UEs, thereby improving spectrum utilization efficiency.

It should be noted that, for brief description, the foregoing method embodiments are represented as a series of actions. However, one of ordinary skill in the art should appreciate that the application is not limited to the described order of the actions, because according to the application, some operations may be performed in other orders or simultaneously. It should be further appreciated by one of ordinary skill in the art that the embodiments described in the specification are are used as an example, and the involved actions and modules are not necessarily required by the application.

To better implement the foregoing solutions of the embodiments of the application, the following further provides related apparatuses for implementing the foregoing solutions.

Figure 5:
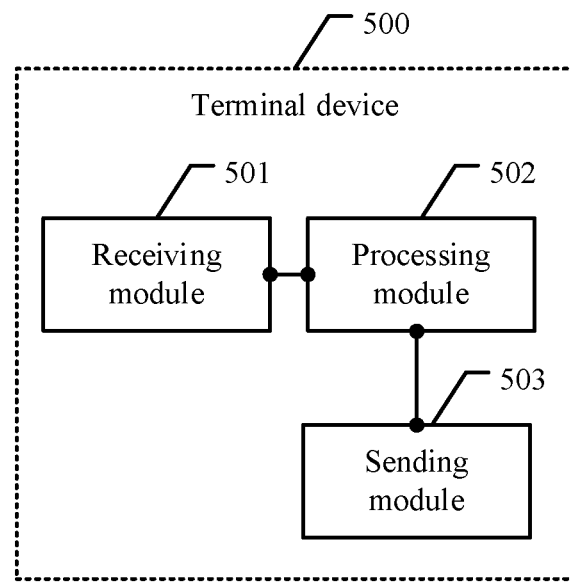
FIG. 5 is a schematic structural composition diagram of a terminal device according to an embodiment of the application.

FIG. 5 is a schematic structural composition diagram of a terminal device 500 according to an embodiment of the application. The terminal device 500 may include:

a receiving module 501, configured to receive downlink control information sent by a network device, where the downlink control information includes a resource allocation field, the resource allocation field is used to indicate an allocated resource block or subcarrier resource, and the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer;

a processing module 502, configured to determine, based on the resource allocation field, whether the resource block or the subcarrier resource is allocated; and a sending module 503, configured to send information on the allocated resource block or subcarrier resource.

In some embodiments of the application, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the receiving module 501 is further configured to receive radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where W is a positive integer; or the receiving module 501 is further configured to receive radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the receiving module 501 is further configured to receive radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

In some embodiments of the application, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

Herein, based on the combination of M, L, K, W, X, T, N, and Y, the resource block and the subcarrier resource are allocated similarly as what is described above, and details are not described herein again.

In some embodiments of the application, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

Herein, based on the combination of M, L, K, W, X, T, N, and Y, the resource block and the subcarrier resource are allocated similarly as what is described above, and details are not described herein again.

Figure 6:
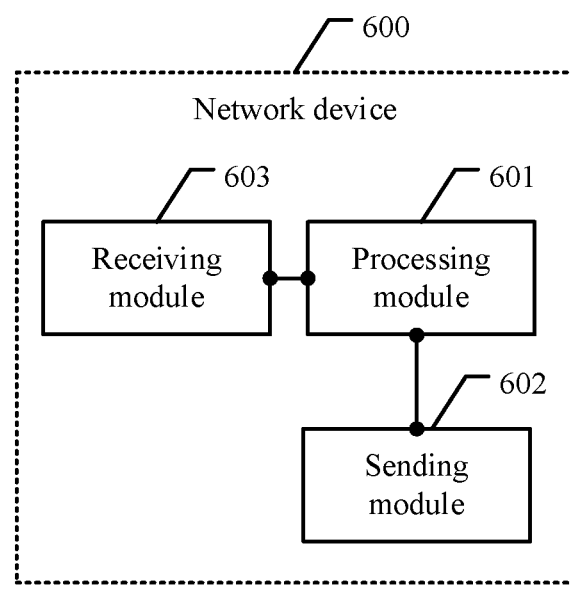
FIG. 6 is a schematic structural composition diagram of a network device according to an embodiment of the application.

As shown in FIG. 6, a network device 600 provided in an embodiment of the application may include:

a processing module 601, configured to allocate a resource block or a subcarrier resource to a terminal device, where the processing module is further configured to determine downlink control information, where the downlink control information includes a resource allocation field, the resource allocation field is used to indicate the allocated resource block or subcarrier resource, the resource allocation field includes $$\left\lceil \log_2 \left\lfloor \frac{N_{RB}^{UL}}{6} \right\rfloor \right\rceil$$

high-order bits and M low-order bits, where M is a positive integer, and $N_{RB}^{UL}$ represents a quantity of resource blocks included in uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits can be used to indicate allocation of resource blocks in a narrowband, a quantity of resource blocks indicated by each of the L bit states is greater than or equal to 1, and the resource allocation field indicates the allocated resource block by using one of the L bit states, where L is a positive integer; or when the resource allocation field is used to indicate the allocated subcarrier resource, K bit states in bit states of the M bits can be used to indicate allocation of subcarrier resources, a quantity of subcarriers indicated by each of the K bit states is less than 12, and the resource allocation field indicates the allocated subcarrier resource by using one of the K bit states, where K is a positive integer;

a sending module 602, configured to send the downlink control information to the terminal device; and a receiving module 603, configured to receive, on the resource block or the subcarrier resource allocated by the processing module, information sent by the terminal device.

In some embodiments of the application, when the resource allocation field is used to indicate the allocated subcarrier resource, that K bit states in bit states of the M bits can be used to indicate allocation of subcarrier resources includes:

the K bit states can be used to indicate resource allocation of three subcarriers or six subcarriers in any one of X resource blocks in the narrowband, and each of the K bit states corresponds to one of W values of a quantity of resource units, where X is a positive integer, and W is a positive integer; or the sending module 602 is further configured to send radio resource control signaling or medium access control signaling, where T resource blocks are configured by using the radio resource control signaling or the medium access control signaling, and T is a positive integer; and that K bit states in bit states of the M bits can be used to indicate allocation of subcarrier resources includes:

the K bit states can be used to indicate resource allocation of three subcarriers or six subcarriers in any one of the T resource blocks, and each of the K bit states corresponds to one of W values of a quantity of resource units, where T is a positive integer, and W is a positive integer; or the sending module 602 is further configured to send radio resource control signaling or medium access control signaling, where N resource blocks are configured by using the radio resource control signaling or the medium access control signaling, and N is a positive integer; and that K bit states in bit states of the M bits can be used to indicate allocation of subcarrier resources includes:

the K bit states can be used to indicate resource allocation of two subcarriers, three subcarriers, or six subcarriers in any one of the N resource blocks, and each of the K bit states corresponds to one of W values of a quantity of resource units, where W is a positive integer; or the sending module 602 is further configured to send radio resource control signaling or medium access control signaling, where Y resource blocks are configured by using the radio resource control signaling or the medium access control signaling, and Y is a positive integer; and that K bit states in bit states of the M bits can be used to indicate allocation of subcarrier resources includes:

the K bit states can be used to indicate resource allocation of two subcarriers, three subcarriers, or six subcarriers in any one of the Y resource blocks.

In some embodiments of the application, the terminal device is at a coverage enhancement level 0 or a coverage enhancement level 1, or in a coverage enhancement mode A; and M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

Herein, based on the combination of M, L, K, W, X, T, N, and Y, the resource block and the subcarrier resource are allocated similarly as what is described above, and details are not described herein again.

In some embodiments of the application, the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

Herein, based on the combination of M, L, K, W, X, T, N, and Y, the resource block and the subcarrier resource are allocated similarly as what is described above, and details are not described herein again.

It should be noted that content such as information exchange between the modules/units of the apparatus and the execution processes thereof and the method embodiments of the application are based on the same conception, and produce the same technical effects. For specific content, refer to the foregoing descriptions of the method embodiments of the application, and the details are not described herein again.

An embodiment of the application further provides a computer storage medium. The computer storage medium stores a program, and the program executes some or all of the operations recorded in the foregoing method embodiments.

Figure 7:
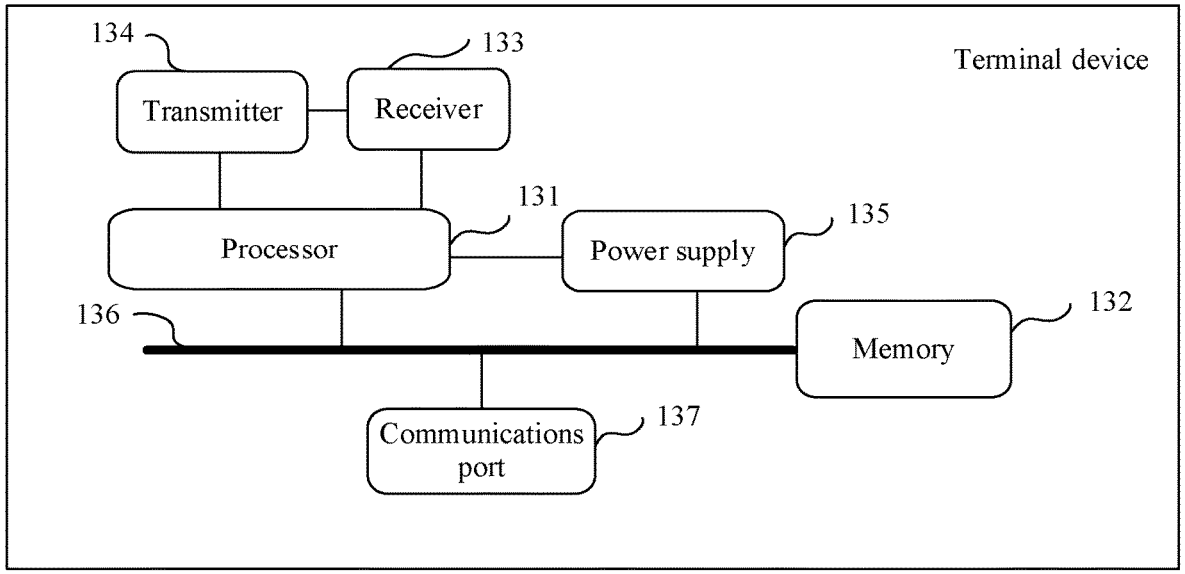
FIG. 7 is a schematic structural composition diagram of another terminal device according to an embodiment of the application.

FIG. 7 is a schematic structural diagram of another device according to an embodiment of the application. The device is a terminal device, and the terminal device may include: a processor 131 (for example, a CPU), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed RAM memory, or may further include a non-volatile memory NVM, for example, at least one magnetic disk storage. The memory 132 may store various instructions, to implement various processing functions and implement operations in the embodiments of the application. Optionally, the terminal device in an embodiment of the application may further include one or more of a power supply 135, a communications bus 136, and a communications port 137. The receiver 133 and the transmitter 134 may be integrated into a transceiver of the terminal device, or may be an independent receive antenna and an independent transmit antenna on the terminal device. The communications bus 136 is configured to implement communication connection between components. The communications port 137 is configured to implement connection and communication between the terminal device and another peripheral.

In an embodiment of the application, the memory 132 is configured to store computer-executable program code. The program code includes an instruction. When the processor 131 executes the instruction, the instruction enables the processor 131 to perform a processing action of the terminal device in the foregoing method embodiments, and enables the transmitter 134 to perform a sending action of the terminal device in the foregoing method embodiments. Their implementation principles and technical effects are similar, and details are not described herein again.

Figure 8:
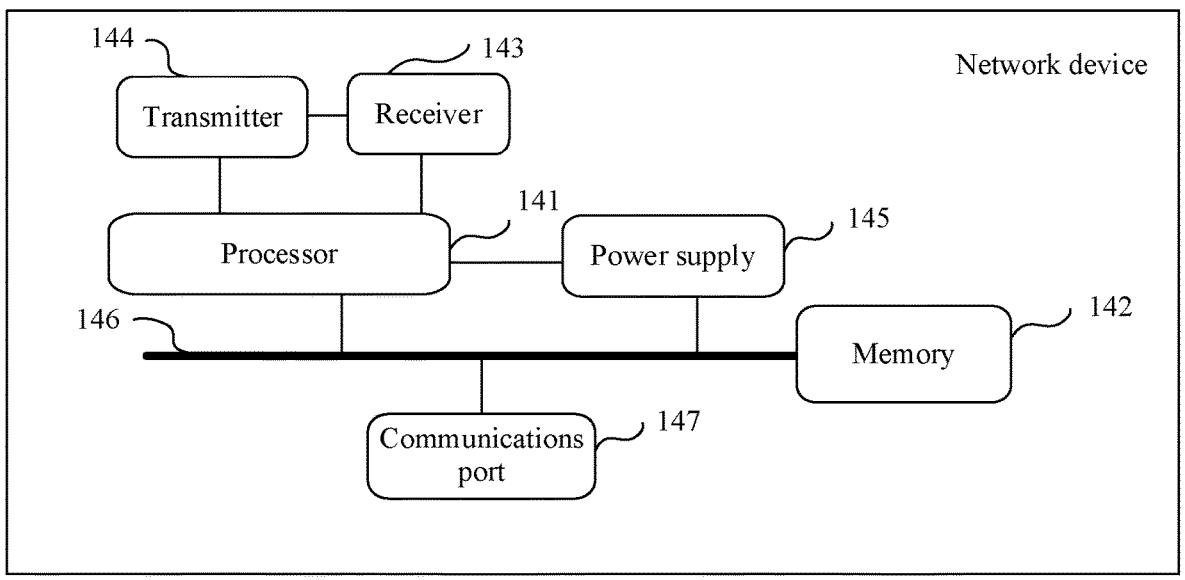
FIG. 8 is a schematic structural composition diagram of another network device according to an embodiment of the application.

FIG. 8 is a schematic structural diagram of still another device according to an embodiment of the application. The device is a network device, and the network device may include a processor (for example, a CPU) 141, a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, or may further include a non-volatile memory NVM, for example, at least one magnetic disk storage. The memory 142 may store various instructions, to implement various processing functions and implement operations in the embodiments of the application. Optionally, the network device in an embodiment of the application may further include one or more of a power supply 145, a communications bus 146, and a communications port 147. The receiver 143 and the transmitter 144 may be integrated into a transceiver of the network device, or may be an independent receive antenna and an independent transmit antenna on the network device. The communications bus 146 is configured to implement communication connection between components. The communications port 147 is configured to implement connection and communication between the network device and another peripheral.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the wireless communication method according to any one of the embodiments as described herein. Optionally, the storage unit is a storage unit in the chip, such as a register or a cache. Alternatively, the storage unit may be a storage unit that is in the terminal and that is located outside the chip, such as a read-only memory (ROM) or another type of static storage device that can store static information and an instruction, or a random access memory (RAM).

The processor mentioned in any one of the foregoing embodiments may be a general-purpose central processing unit (CPU), a microprocessor, an application-specific integrated circuit (ASIC), or one or more integrated circuits configured to control program execution of the wireless communication methods as described herein.

In addition, it should be noted that the described apparatus embodiments are merely examples. The units described as separate parts may or may not be physically separate, and parts displayed as units may or may not be physical units, may be located at one position, or may be distributed on a plurality of network units. Some or all the modules may be selected according to actual needs to achieve the objectives of the solutions of the embodiments. In addition, in the accompanying drawings of the apparatus embodiments provided in the application, connection relationships between modules indicate that the modules have communication connections with each other, which may be specifically implemented as one or more communications buses or signal cables. One of ordinary skill in the art may understand and implement the embodiments of the invention without creative efforts.

Based on the descriptions of the foregoing embodiments, one skilled in the art may clearly understand that the application may be implemented by software in addition to necessary universal hardware, or by dedicated hardware, including a dedicated integrated circuit, a dedicated CPU, a dedicated memory, a dedicated component, and the like. Generally, any function that is performed by a computer program can be easily implemented by using corresponding hardware. Moreover, a specific hardware structure used to achieve a same function may be of various forms, for example, in a form of an analog circuit, a digital circuit, or a dedicated circuit. However, as for the application, software program implementation is a better implementation in most cases. Based on such an understanding, the technical solutions of the application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions described in the embodiments of the application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An information transmission method, comprising:
receiving, by a terminal device, a downlink control information sent by a network device, wherein the downlink control information comprises a resource allocation field, wherein the resource allocation field is used to indicate an allocated resource block or subcarrier resource, and the resource allocation field comprises $$\left\lceil \log_2 \left\lceil \frac{N_{RB}^{UL}}{6} \right\rceil \right\rceil$$

high-order bits and M low-order bits, wherein M is a positive integer, and $N_{RB}^{UL}$ represents a quantity of resource blocks in an uplink bandwidth; and
when the resource allocation field is used to indicate the allocated resource block, the $$\left\lceil \log_2 \left\lceil \frac{N_{RB}^{UL}}{6} \right\rceil \right\rceil$$

high-order bits indicate a narrowband index, L bit states in bit states of the M low-order bits are used to indicate an allocation of resource blocks in a narrowband, a quantity of the resource blocks indicated by each of the L bit states is greater than or equal to 1, and the resource allocation field indicates the allocated resource block by using one of the L bit states, wherein L is a positive integer; and
when the resource allocation field is used to indicate the allocated subcarrier resource, K bit states in bit states of the M bits are used to indicate an allocation of subcarrier resources, a quantity of subcarriers indicated by each of the K bit states is less than 12, and the resource allocation field indicates the allocated subcarrier resource by using one of the K bit states, wherein K is a positive integer, wherein the L and the K are different values of the bit states; and
determining, by the terminal device based on the different values of the bit states included in the resource allocation field, whether the resource block or the subcarrier resource is allocated; and
sending an information on the allocated resource block or subcarrier resource.

2. The method according to claim 1, wherein when the resource allocation field is used to indicate the allocated subcarrier resource,
the K bit states are used to indicate a resource allocation of three subcarriers or six subcarriers in any one of X resource blocks in the narrowband, and each of the K bit states corresponds to one of W values of a quantity of resource units, wherein X is a positive integer, and W is a positive integer; or
the method further comprises: receiving, by the terminal device, a radio resource control signaling or a medium access control signaling, wherein T resource blocks are configured by using the radio resource control signaling or the medium access control signaling, and T is a positive integer; and
the K bit states are used to indicate a resource allocation of three subcarriers or six subcarriers in any one of the T resource blocks, and each of the K bit states corresponds to one of W values of a quantity of resource units, wherein W is a positive integer; or
the method further comprises: receiving, by the terminal device, a radio resource control signaling or a medium access control signaling, wherein N resource blocks are configured by using the radio resource control signaling or the medium access control signaling, and N is a positive integer; and
the K bit states are used to indicate a resource allocation of two subcarriers, three subcarriers, or six subcarriers in any one of the N resource blocks, and each of the K bit states corresponds to one of W values of a quantity of resource units, wherein W is a positive integer; or the method further comprises: receiving, by the terminal device, a radio resource control signaling or a medium access control signaling, wherein Y resource blocks are configured by using the radio resource control signaling or the medium access control signaling, and Y is a positive integer; and the K bit states are used to indicate a resource allocation of two subcarriers, three subcarriers, or six subcarriers in any one of the Y resource blocks.

3. The method according to claim 2, wherein
the terminal device is at a coverage enhancement level 0 or a coverage enhancement level 1, or in a coverage enhancement mode A; and
M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

4. The method according to claim 2, wherein
the terminal device is at a coverage enhancement level 2 or a coverage enhancement level 3, or in a coverage enhancement mode B; and
M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

5. An information transmission method, comprising:
allocating, by a network device, a resource block or a subcarrier resource to a terminal device;
determining, by the network device, a downlink control information, wherein the downlink control information comprises a resource allocation field, wherein the resource allocation field is used to indicate the allocated resource block or subcarrier resource, and the resource allocation field comprises $$\left\lceil \log_2 \left\lfloor \frac{N_{RB}^{UL}}{6} \right\rfloor \right\rceil$$

high-order bits and M low-order bits, wherein M is a positive integer, and $N_{RB}^{UL}$ represents a quantity of resource blocks in an uplink bandwidth; and when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits are used to indicate an allocation of resource blocks in a narrowband, a quantity of the resource blocks indicated by each of the L bit states is greater than or equal to 1, and the resource allocation field indicates the allocated resource block by using one of the L bit states, wherein L is a positive integer; and when the resource allocation field is used to indicate the allocated subcarrier resource, K bit states in bit states of the M bits are used to indicate an allocation of subcarrier resources, a quantity of subcarriers indicated by each of the K bit states is less than 12, and the resource allocation field indicates the allocated subcarrier resource by using one of the K bit states, wherein K is a positive integer, wherein the L and the K are different values of the bit states included in the resource allocation field that the network device uses to indicate to the terminal device the allocated resource block or the subcarrier resource respectively;

sending, by the network device, the downlink control information to the terminal device; and receiving, by the network device on the allocated resource block or the subcarrier resource, an information sent by the terminal device.

6. The method according to claim 5, wherein when the resource allocation field is used to indicate the allocated subcarrier resource, the K bit states are used to indicate a resource allocation of three subcarriers or six subcarriers in any one of X resource blocks in the narrowband, and each of the K bit states corresponds to one of W values of a quantity of resource units, wherein X is a positive integer, and W is a positive integer; or the method further comprises: sending, by the network device, a radio resource control signaling or a medium access control signaling, wherein T resource blocks are configured by using the radio resource control signaling or the medium access control signaling, and T is a positive integer; and the K bit states are used to indicate a resource allocation of three subcarriers or six subcarriers in any one of the T resource blocks, and each of the K bit states corresponds to one of W values of a quantity of resource units, wherein W is a positive integer; or the method further comprises: sending, by the network device, a radio resource control signaling or a medium access control signaling, wherein N resource blocks are configured by using the radio resource control signaling or the medium access control signaling, and N is a positive integer; and the K bit states are used to indicate a resource allocation of two subcarriers, three subcarriers, or six subcarriers in any one of the N resource blocks, and each of the K bit states corresponds to one of W values of a quantity of resource units, wherein W is a positive integer; or the method further comprises: sending, by the network device, a radio resource control signaling or a medium access control signaling, wherein Y resource blocks are configured by using the radio resource control signaling or the medium access control signaling, and Y is a positive integer; and the K bit states are used to indicate a resource allocation of two subcarriers, three subcarriers, or six subcarriers in any one of the Y resource blocks.

7. The method according to claim 6, wherein
the terminal device is at a coverage enhancement level 0 or a coverage enhancement level 1, or in a coverage enhancement mode A; and
M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

8. The method according to claim 6, wherein
the terminal device is at a coverage enhancement level 2 or a coverage enhancement level 3, or in a coverage enhancement mode B; and
M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

9. A terminal device, comprising:
a receiving circuit configured to receive a downlink control information sent by a network device, wherein the downlink control information comprises a resource allocation field, wherein the resource allocation field is used to indicate an allocated resource block or subcarrier resource, and the resource allocation field comprises $$\left\lceil \log_2 \left\lfloor \frac{N_{RB}^{UL}}{6} \right\rfloor \right\rceil$$

high-order bits and M low-order bits, wherein M is a positive integer, and $N_{RB}^{UL}$ represents a quantity of resource blocks in an uplink bandwidth; and
when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits are used to indicate an allocation of resource blocks in a narrowband, a quantity of the resource blocks indicated by each of the L bit states is greater than or equal to 1, and the resource allocation field indicates the allocated resource block by using one of the L bit states, wherein L is a positive integer; and
when the resource allocation field is used to indicate the allocated subcarrier resource, K bit states in bit states of the M bits are used to indicate an allocation of subcarrier resources, a quantity of subcarriers indicated by each of the K bit states is less than 12, and the resource allocation field indicates the allocated subcarrier resource by using one of the K bit states, wherein K is a positive integer, wherein the L and the K are different values of the bit states; a processor coupled to the receiving circuit, wherein the processor is configured to
determine, based on the different values of the bit states included in the resource allocation field, whether the resource block or the subcarrier resource is allocated; and
a sending circuit coupled to the processor, configured to send an information on the allocated resource block or subcarrier resource.

10. The terminal device according to claim 9, wherein when the resource allocation field is used to indicate the allocated subcarrier resource,
the K bit states are used to indicate a resource allocation of three subcarriers or six subcarriers in any one of X resource blocks in the narrowband, and each of the K bit states corresponds to one of W values of a quantity of resource units, wherein X is a positive integer, and W is a positive integer; or
the receiving circuit is further configured to receive a radio resource control signaling or a medium access control signaling, wherein T resource blocks are configured by using the radio resource control signaling or the medium access control signaling, and T is a positive integer; and
the K bit states are used to indicate a resource allocation of three subcarriers or six subcarriers in any one of the T resource blocks, and each of the K bit states corresponds to one of W values of a quantity of resource units, wherein W is a positive integer; or
the receiving circuit is further configured to receive a radio resource control signaling or a medium access control signaling, wherein N resource blocks are configured by using the radio resource control signaling or the medium access control signaling, and N is a positive integer; and
the K bit states are used to indicate a resource allocation of two subcarriers, three subcarriers, or six subcarriers in any one of the N resource blocks, and each of the K bit states corresponds to one of W values of a quantity of resource units, wherein W is a positive integer; or
the receiving circuit is further configured to receive a radio resource control signaling or a medium access control signaling, wherein Y resource blocks are configured by using the radio resource control signaling or the medium access control signaling, and Y is a positive integer; and
the K bit states are used to indicate a resource allocation of two subcarriers, three subcarriers, or six subcarriers in any one of the Y resource blocks.

11. The terminal device according to claim 10, wherein the terminal device is at a coverage enhancement level 0 or a coverage enhancement level 1, or in a coverage enhancement mode A; and
M=7, L=21, K=107, W=3, and X=6;
M=7, L=21, K=105, W=3, and X=6;
M=7, L=20, K=108, W=3, and X=6;
M=7, L=20, K=106, W=3, and X=6;

M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;
M=7, L=21, K=90, W=3, and N=3; or
M=6, L=21, K=40, and Y=4.

12. The terminal device according to claim 10, wherein the terminal device is at a coverage enhancement level 2 or a coverage enhancement level 3, or in a coverage enhancement mode B; and
M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

13. A network device, comprising:
a processor; and
a memory coupled to the processor, wherein the processor is configured to allocate a resource block or a subcarrier resource to a terminal device,
determine a downlink control information, wherein the downlink control information comprises a resource allocation field, wherein the resource allocation field is used to indicate the allocated resource block or subcarrier resource, and the resource allocation field comprises $$\left\lceil \log_2 \left\lfloor \frac{N_{RB}^{UL}}{6} \right\rfloor \right\rceil$$

high-order bits and M low-order bits, wherein M is a positive integer, and $N_{RB}^{UL}$ represents a quantity of resource blocks in an uplink bandwidth; and
when the resource allocation field is used to indicate the allocated resource block, the $$\left\lceil \log_2 \left\lfloor \frac{N_{RB}^{UL}}{6} \right\rfloor \right\rceil$$

high-order bits indicate a narrowband index, L bit states in bit states of the M low-order bits are used to indicate an allocation of resource blocks in a narrowband, a quantity of the resource blocks indicated by each of the L bit states is greater than or equal to 1, and the resource allocation field indicates the allocated resource block by using one of the L bit states, wherein L is a positive integer; or
when the resource allocation field is used to indicate the allocated subcarrier resource, K bit states in bit states of the M bits are used to indicate an allocation of subcarrier resources, a quantity of subcarriers indicated by each of the K bit states is less than 12, and the resource allocation field indicates the allocated subcarrier resource by using one of the K bit states, wherein K is a positive integer, wherein the L and the K are different values of the bit states included in the resource allocation field that the network device uses to indicate to the terminal device the allocated resource block or the subcarrier resource respectively;
a sending circuit coupled to the processor, configured to send the downlink control information to the terminal device; and
a receiving circuit coupled to the processor, configured to receive, on the resource block or the subcarrier resource allocated by the processor, an information sent by the terminal device.

14. The network device according to claim 13, wherein when the resource allocation field is used to indicate the allocated subcarrier resource,
the K bit states are used to indicate a resource allocation of three subcarriers or six subcarriers in any one of X resource blocks in the narrowband, and each of the K bit states corresponds to one of W values of a quantity of resource units, wherein X is a positive integer, and W is a positive integer; or
the sending circuit is further configured to send a radio resource control signaling or a medium access control signaling, wherein T resource blocks are configured by using the radio resource control signaling or the medium access control signaling, and T is a positive integer; and
the K bit states are used to indicate a resource allocation of three subcarriers or six subcarriers in any one of the T resource blocks, and each of the K bit states corresponds to one of W values of a quantity of resource units, wherein W is a positive integer; or
the sending circuit is further configured to send a radio resource control signaling or a medium access control signaling, wherein N resource blocks are configured by using the radio resource control signaling or the medium access control signaling, and N is a positive integer; and
the K bit states are used to indicate a resource allocation of two subcarriers, three subcarriers, or six subcarriers in any one of the N resource blocks, and each of the K bit states corresponds to one of W values of a quantity of resource units, wherein W is a positive integer; or
the sending circuit is further configured to send a radio resource control signaling or a medium access control signaling, wherein Y resource blocks are configured by using the radio resource control signaling or the medium access control signaling, and Y is a positive integer; and
the K bit states are used to indicate a resource allocation of two subcarriers, three subcarriers, or six subcarriers in any one of the Y resource blocks.

15. The network device according to claim 14, wherein the terminal device is at a coverage enhancement level 0 or a coverage enhancement level 1, or in a coverage enhancement mode A; and
M=7, L=21, K=107, W=3, and X=6;
M=7, L=21, K=105, W=3, and X=6;
M=7, L=20, K=108, W=3, and X=6;
M=7, L=20, K=106, W=3, and X=6;
M=7, L=20, K=96, W=4, and X=4;
M=7, L=21, K=107, W=3, and T=6;
M=7, L=21, K=105, W=3, and T=6;
M=7, L=20, K=108, W=3, and T=6;
M=7, L=20, K=106, W=3, and T=6;
M=7, L=20, K=96, W=4, and T=4;

M=7, L=21, K=90, W=3, and N=3; or
M=6, L=21, K=40, and Y=4.

16. The network device according to claim 14, wherein the terminal device is at a coverage enhancement level 2 or a coverage enhancement level 3, or in a coverage enhancement mode B; and M=5, L=8, K=24, W=2, and X=2;
M=5, L=8, K=24, W=4, and X=1;
M=5, L=8, K=18, W=3, and X=1;
M=7, L=8, K=120, W=4, and X=5;
M=5, L=8, K=24, W=2, and T=2;
M=5, L=8, K=24, W=4, and T=1;
M=5, L=8, K=18, W=3, and T=1;
M=7, L=8, K=120, W=4, and T=5;
M=5, L=8, K=20, W=2, and N=1;
M=7, L=8, K=120, W=3, and N=4;
M=7, L=8, K=120, W=4, and N=3;
M=7, L=8, K=120, W=2, and N=6; or
M=5, L=8, K=20, and Y=2.

* * * * *